United States Patent [19]

Stanley et al.

[11] Patent Number: 5,775,985
[45] Date of Patent: Jul. 7, 1998

[54] ZERO TIME CLIPPER

[75] Inventors: Thomas Ralph Stanley, Georgetown, Ill.; Mark David Kelley, Kansas City, Mo.; James Allen Snider, Georgetown; Jerry Edward Armstrong, Danville, both of Ill.

[73] Assignee: Devro-Teepak, Inc., Westchester, Ill.

[21] Appl. No.: 857,345

[22] Filed: May 16, 1997

Related U.S. Application Data

[63] Continuation of Ser. No. 520,583, Aug. 29, 1995, abandoned.

[51] Int. Cl.⁶ ..................................................... A22C 11/00
[52] U.S. Cl. ................................. 452/48; 452/29; 452/46
[58] Field of Search ............................ 452/48, 46, 47, 452/29

[56] References Cited

U.S. PATENT DOCUMENTS

| | | | |
|---|---|---|---|
| 3,975,795 | 8/1976 | Kupcikevicius et al. | 452/48 |
| 4,044,426 | 8/1977 | Kupcikevicius et al. | 452/48 |
| 4,073,039 | 2/1978 | Müller | 452/47 |
| 4,129,923 | 12/1978 | Hoegger | 452/46 |
| 4,438,545 | 3/1984 | Kupcikevicius et al. | 452/48 |
| 4,847,951 | 7/1989 | Kollross | 452/48 |
| 5,156,566 | 10/1992 | Righele | 452/46 |

FOREIGN PATENT DOCUMENTS

| | | |
|---|---|---|
| 9201169 | 1/1994 | Niger . |
| 90/05671 | 5/1990 | WIPO . |

*Primary Examiner*—Willis Little
*Attorney, Agent, or Firm*—Michael L. Dunn

[57] ABSTRACT

A method for stuffing food product into a tubular food casing at a predetermined linear rate of movement of stuffed food product, closing the stuffed food product to segregate the stuffed food product into links while the stuffed food product continues to move at said predetermined rate. The invention also includes an improved food product stuffing machine which stuffs food product into a tubular food casing at a predetermined linear rate of movement of stuffed food product, a closing device which applies closures to the stuffed food product to segregate the stuffed food product into stuffed food product links while the stuffed food product continues to move at said predetermined rate. After clipping, means is provided for returning the closing device to an original position to repeat the operation after another desired length of casing is stuffed.

10 Claims, 3 Drawing Sheets

ZERO TIME CLIPPER

This is a continuation of application Ser. No. 08/520,583, filed Aug. 29, 1995, now abandoned.

BACKGROUND OF THE INVENTION

This invention relates to stuffing of tubular food casing with food product and more particularly relates to a method and apparatus for efficiently applying clips or ties to stuffed food product for separation into discrete "links".

It has been known that food product stuffed into tubular food casing can be separated into discrete links by means of ties or clips. Unfortunately such linking has been an inefficient operation since in order to apply a tie or clip the stuffing operation has to be momentarily stopped. This has had a number of disadvantages. In particular the repeated starting and stopping of the stuffing operation is time consuming thus slowing the stuffing process. In addition food product is supplied to the casing by means of a food product pump which must be repeatedly turned on and off as the stuffing operation starts and stops. This is not only hard on the pump but creates pressure surges of food product which contributes to a non-uniform diameter in the finished stuffed product.

It is therefore an object of the present invention to provide a method and apparatus which permits improved production rates for stuffed tubular food casing and which permits the production of product having a more uniform stuffed diameter.

BRIEF DESCRIPTION OF THE INVENTION

In accordance with the invention there is therefore provided a method for stuffing food product into a tubular food casing at a predetermined linear rate of movement of stuffed food product, closing the stuffed food product to segregate the stuffed food product into links while the stuffed food product continues to move at said predetermined rate.

The invention also includes an improved food product stuffing machine which stuffs food product into a tubular food casing at a predetermined linear rate of movement of stuffed food product, a closing device which applies closures to the stuffed food product to segregate the stuffed food product into stuffed food product links while the stuffed food product continues to move at said predetermined rate. After clipping, means is provided for returning the closing device to an original position to repeat the operation after another desired length of casing is stuffed.

In accordance with the present invention, the closures are usually, but not essentially, clips and the food product is usually, but not essentially, sausage product. When the term "sausage" or "sausage casing" are used herein, it is to be understood that the invention also applies to other stuffable "foodstuffs" within "food casings".

When the apparatus of the invention uses clips as the closing means, the apparatus includes a clipping mechanism which moves from a starting position with the stuffed sausage product at said predetermined rate during application of a clip to the sausage product and includes means for returning the clipping mechanism to the starting position after the clip is applied.

In a preferred embodiment, the clipping mechanism comprises a first V shaped jaw and a second V shaped jaw which move toward each other to compress and narrow the stuffed sausage product in preparation for application of a clip and also comprises a means for applying a U shaped clip over the narrowed portion of the stuffed sausage product followed by bending legs of the clip to retain and segregate sausage links.

DETAILED DESCRIPTION OF THE INVENTION

Figure 1:
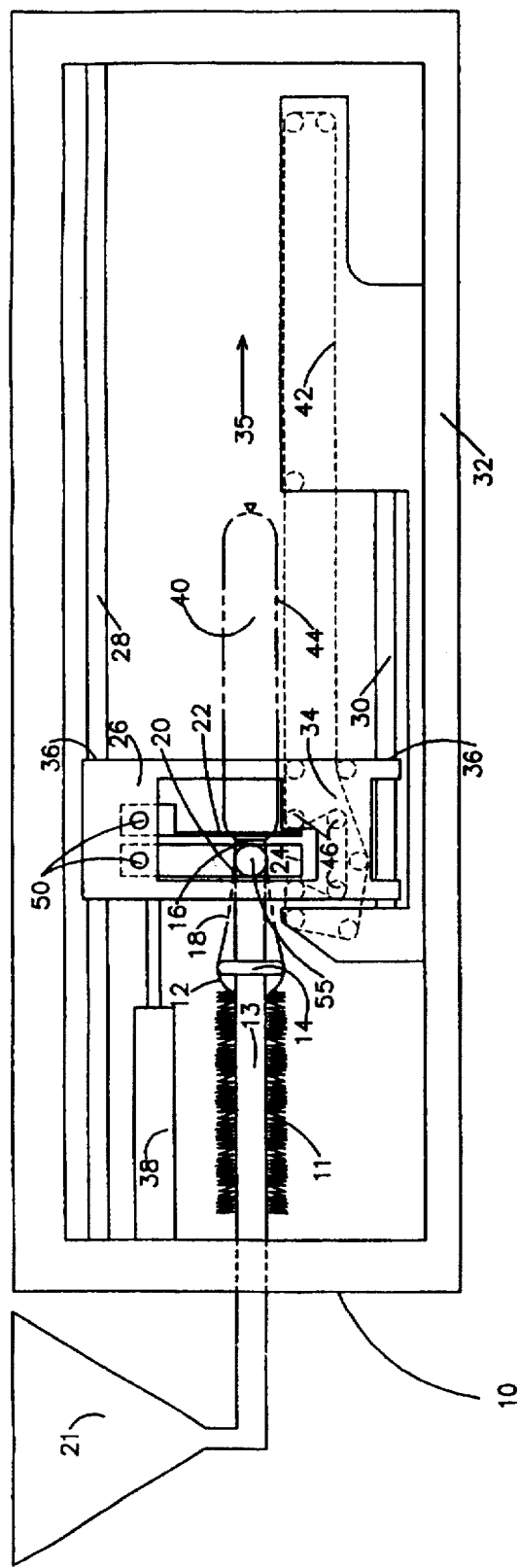
FIG. 1 is a side cross-sectional view of the machine of the invention showing the closing and clipping devices at a first position proximate the end of the stuffing horn wherein the closing and clipping devices are open.
Figure 2:
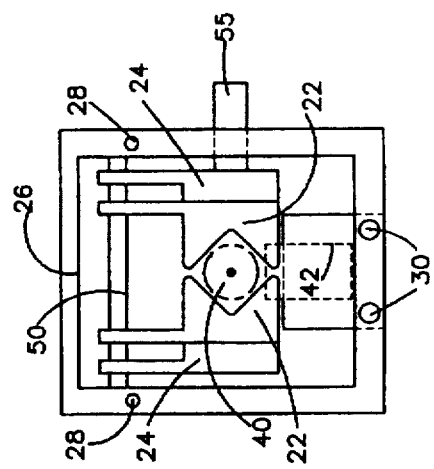
FIG. 2 is a right end view of the apparatus shown in FIG. 1.
Figure 3:
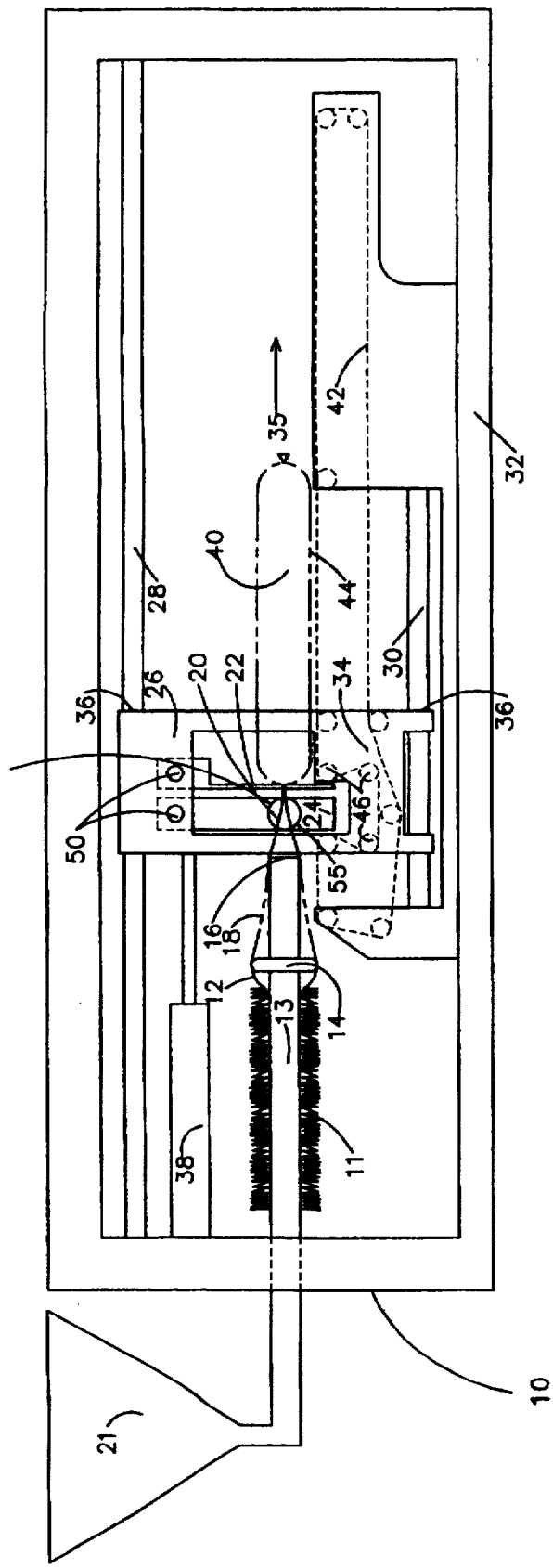
FIG. 3 is a side cross-sectional view of the machine of FIG. 1 wherein the closing and clipping mechanisms are in a second position further from the stuffing horn than in FIG. 1 wherein the closing mechanism is closed upon the casing.
Figure 4:
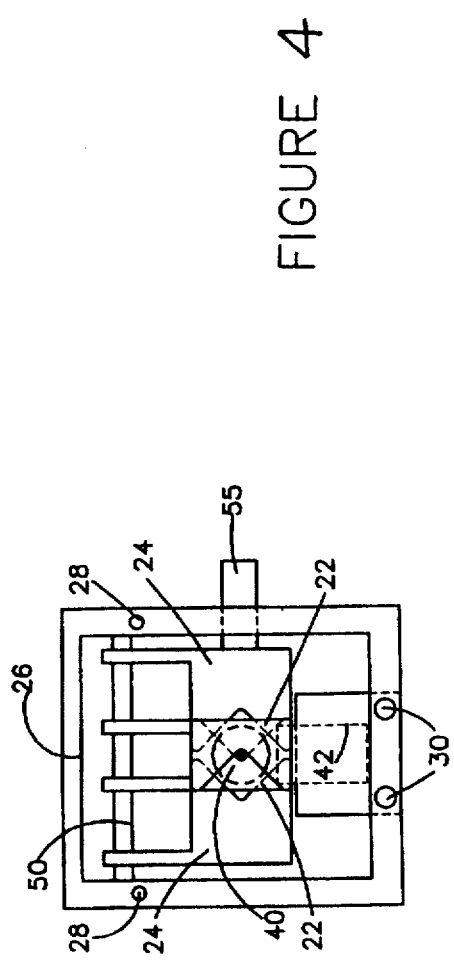
FIG. 4 is a right end view of the machine shown in FIG. 3.
Figure 5:
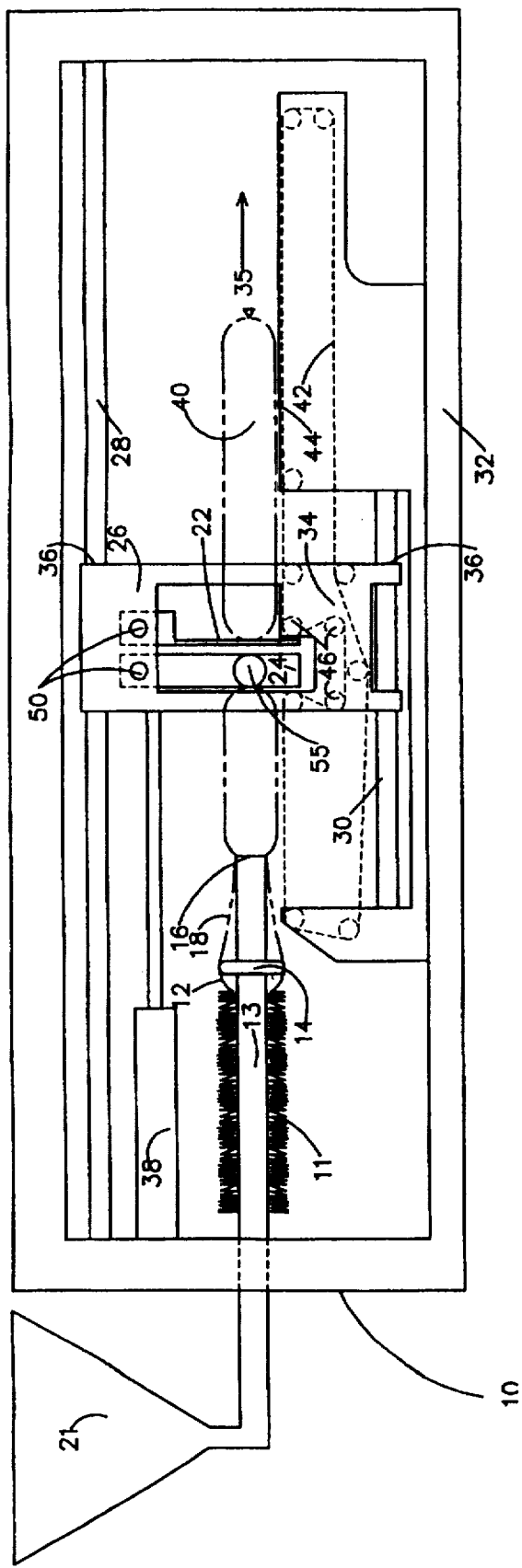
FIG. 5 is a side cross-sectional view of the machine of FIG. 3 wherein the closing and clipping mechanisms are in a third position still further from the stuffing horn than in FIG. 3 wherein the closing mechanism is closed and the clipping mechanism has been actuated.
Figure 6:
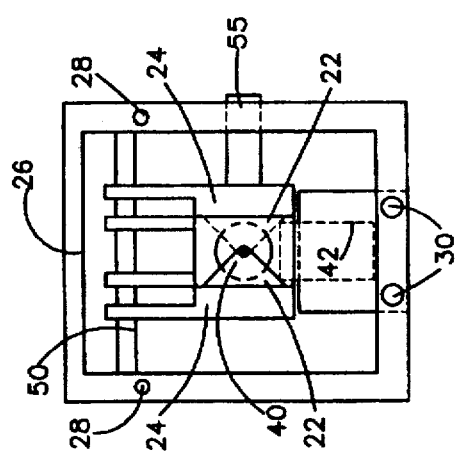
FIG. 6 is an end view of the machine of FIG. 5.

"Food product" as used herein means essentially any food which can be stuffed into a tubular film casing. The most common of such foods are sausage meats, e.g. frankfurters, bologna, salami, Italian sausage, Polish sausage, knockwurst, bratwurst, liver sausage, summer sausage, etc. Other foods also can be stuffed into such casings, e.g. fish paste, turkey breast, whole and processed ham, cheeses, processed chicken, etc.

"Stuffed" means to be introduced into a tubular film casing. Such stuffing may be accomplished by any suitable means which usually involves passing the food product through a stuffing horn upon which tubular film casing has been placed.

"Tubular film casing" means a film in the form of a tube or hose. Such tubular films may be originally extruded in a tubular form or may be later formed from a flat film by sealing opposing edges of a flat film. The film used to form the casing may be any suitable film such as regenerated cellulose, collagen, and plastic, any of which may optionally be reinforced with fibers, e.g. a non-woven cellulose fiber paper.

"Continuously" means without stopping, except for purposes of resupplying food product or tubular film casing, if required.

"Stuffed food product" means the product resulting from stuffing the food product into a tubular film casing.

"Predetermined linear rate" means an essentially constant continuous throughput of finished stuffed food product.

"Closing the stuffed food product" means to tie, clip or otherwise secure the end of the tubular food casing, at the end into which stuffing took place, after stuffing to retain the food product within the casing and to form segregated "links".

The means for moving the closing device with the stuffed food product and returning it may be any suitable means such as a carriage operated by a servo motor, or a series of gears, belts or chains and sprockets.

The invention may be better understood by reference to the drawings which illustrate a preferred embodiment of the machine of the invention for practicing the method of the invention.

The drawings illustrate a preferred embodiment of a machine 10 of the invention. Referring to the drawings, a shirred stick 11 of tubular food casing 12 is placed over a stuffing horn 13 and a sizing ring 14 is then placed over an end 16 of the stuffing horn 13 after a section 18 of casing 12 is pulled from the shirred stick 11.

The open end 20 of section 18 is then closed by gathering casing 12 at the end by means of gathering mechanism 22 and applying a clip by means of clipping mechanism 24.

Gathering mechanism 22 and clipping mechanism 24 are secured to horizontal transport 26 and are slidably mounted on shafts 50. Horizontal transport 26 comprises upper horizontal guide rods rods 28, and lower horizontal guide rods 30, all of which are secured to frame 32 of the machine. Transport 26 also comprises carriage 34 which rides upon upper and lower guide rods 28 and 30 using slide bearings 36. Carriage 34 is moved in both directions along the guide rods by means of servo motor 38.

After the end of casing 12 is clipped food product is passed through stuffing horn 13 at a rate which is controlled by a food pump 21. As a result food casing 12 is drawn from stick 11 to form stuffed food product 40 which moves at a linear rate matched to the entry of sufficient food into the casing for stuffing.

After a desired length of food casing is stuffed, carriage 34 is moved in the direction of movement 35 of stuffed food product at a rate which matches the linear rate of movement of stuffed food product. As the carriage moves, the casing is gathered and clipped by the carried gathering and clipping mechanisms 22 and 24 at the desired location for closing the casing to form a finished "link" of stuffed food product. The gathering and clipping thus occurs without interrupting the flow of food product or slowing the rate of movement of stuffed food product.

As soon as the clipping is complete, the servo motor reverses and returns the carriage 34, with carried gathering and clipping mechanisms, so that the mechanisms are positioned to again activate when a desired closing position on the stuffed food product reaches the mechanisms.

As can also be seen in the drawings, stuffed food product is carried by belt conveyor 42 as it is formed at the end of the stuffing horn. Since the gathering and clipping mechanisms partly operate at a level below a bottom edge 44 of stuffed food product, the belt conveyor of the preferred embodiment is unique in that it drops away from bottom edge 44 in the area of the gathering and clipping mechanisms. This is particularly interesting in that the portion of the belt conveyor which must drop away changes as the gathering and clipping mechanisms move. This is accomplished by dropping the belt around rollers 46 secured to carriage 34 such that as the carriage is moved, the belt is always below the bottom edge 44 in the area of the gathering and clipping mechanisms.

The gathering mechanism attached to the carriage comprises opposing gathering shutters which have V shaped grooves which gather the casing into a tight area as the gathering shutters 48 move toward each other. The gathering shutters are moved toward each other by any suitable means such as one or more air operated pistons or servo motors.

After gathering a clip punch comprising cylinder 55 moves a U shaped clip around the gathered casing and against a die which bends legs of the clip thus securing it to the casing. The clip punch may also be operated by any suitable means such as an air actuated piston.

In operation, after the first clip is placed on end 20 of the casing, food product flows from the stuffing horn into the casing to form stuffed food product which is carried from the stuffing horn at a predetermined rate by means of conveyor 42. After a desired length of stuffed food product is made, carriage 34 moves in the direction of travel of the stuffed food product at a location along the stuffed food product where a clip is desired. As the carriage moves, gathering shutters 48 move toward each other to gather the casing in preparation for receipt of a clip. Subsequent to gathering a clip punch, carrying a clip, places the clip around the gathered casing and impinges the clip upon a die which folds the clip around and secures it to, the gathered casing.

The method and apparatus of the invention overcomes the previously discussed disadvantages associated with closing links of stuffed food product. For example, it is not necessary to stop the stuffing operation to close the casing to form links thus production rate is increased. It is not necessary to stop and start a pump for food product thus saving wear on the pump and food product surges are reduced or eliminated thus resulting in a more uniform product.

In a time comparison the apparatus of the present invention will stuff links or chubs over thirty percent faster than the present state-of-the-art commercial "T-SIZER φ" stuffing machine without even considering less down time due to extended pump life.

What is claimed is:

1. A method for stuffing food product into a tubular food casing which comprises:
    a) continuously filling a tubular food casing to obtain a predetermined linear rate of movement of stuffed food product;
    b) from an initial starting position, moving a single closing device along a path with said food casing at said predetermined linear rate of movement;
    c) activating said closing device to apply a prior double closure in the form of ties or clips to the stuffed food product while the stuffed food product continues to move at said predetermined rate;
    d) returning the closing device in a reverse direction along said path to said initial position;
    e) again moving the closing device along the path; and
    f) again activating the closing device to apply a subsequent double closure in the form of ties or clips to form a link in the stuffed food product between the prior and subsequent closures; and again repeating steps d) through f).

2. An improved food product stuffing machine which stuffs food product into a tubular food casing which comprises:
    means for continuously stuffing the food product into the tubular casing so as to obtain a predetermined linear rate of continuous movement of stuffed food product;
    a single closing device which can apply a double closure in the form of clips or ties to the stuffed food product;
    means for moving said closing device from an initial position along a path with said stuffed food product at said predetermined linear rate;
    means for activating said closing device to apply a prior double closure in the form of clips or ties to the stuffed food product while the stuffed food product continues to move at said predetermined rate;
    means for returning the closing device in a reverse direction along said path to said initial position;
    means for again moving the closing device along the path; and
    means for again activating the closing device to apply a subsequent double closure in the form of ties or clips to form a link in the stuffed food product between the prior and subsequent closures; and again repeating steps d) through f).

3. The machine of claim 2 wherein the closing device is a clipping device which applies clips to the stuffed food product.

4. The machine of claim 3 wherein the clipping device comprises a clipping mechanism which moves from the initial position with the stuffed sausage product at said predetermined rate during application of clips to the sausage product.

5. The machine of claim 4 wherein means is provided for returning the clipping mechanism to the initial position after the clip is applied.

6. The machine of claim 4 wherein the clipping mechanism comprises a first V shaped jaw and a second V shaped jaw which move toward each other to compress and narrow the stuffed sausage product in preparation for application of a clip.

7. The machine of claim 6 wherein the clipping mechanism further comprises a means for applying U shaped clips over the narrowed portion of the stuffed sausage product followed by bending legs of the clips to retain and segregate sausage links.

8. The machine of claim 7 wherein the means for moving the closing mechanism at the predetermined rate and the means for returning the closing mechanism to the initial position, each comprise the same servo motor.

9. The machine of claim 2 wherein the means for moving the stuffed food product comprises a belt conveyor.

10. The machine of claim 2 wherein means is provided for forming a depression in the conveyor belt beneath the closing mechanism, which depression moves with the closing mechanism.

* * * * *